(12) United States Patent
Miroku et al.

(10) Patent No.: US 7,424,724 B2
(45) Date of Patent: Sep. 9, 2008

(54) DISK APPARATUS HAVING DISK INSERTION DETECTING LEVERS DISPOSED IN PLANE OF DISK AND ROTATABLE IN AXIAL DIRECTION RELATIVE TO DISK

(75) Inventors: Nobuyuki Miroku, Ikoma (JP); Shingo Kage, Kobe (JP); Yukihiro Araki, Fujiidera (JP); Shinya Ogasawara, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/576,168

(22) PCT Filed: Oct. 18, 2004

(86) PCT No.: PCT/JP2004/015376

§ 371 (c)(1),
(2), (4) Date: Apr. 19, 2006

(87) PCT Pub. No.: WO2005/038795

PCT Pub. Date: Apr. 28, 2005

(65) Prior Publication Data

US 2007/0074229 A1    Mar. 29, 2007

(30) Foreign Application Priority Data

Oct. 20, 2003    (JP) ............................. 2003-359786

(51) Int. Cl.
*G11B 17/04* (2006.01)
(52) U.S. Cl. ...................................... 720/606
(58) Field of Classification Search ................ 720/606, 720/626, 620, 651; 369/30.32
See application file for complete search history.

(56) References Cited

U.S. PATENT DOCUMENTS

| | | | |
|---|---|---|---|
| 5,260,925 A | 11/1993 | Camps et al. | |
| 5,355,358 A | 10/1994 | Van Alfen | |
| 5,828,641 A | 10/1998 | Abe et al. | |
| 6,222,811 B1 * | 4/2001 | Sakurai et al. | 720/620 |
| 6,226,250 B1 * | 5/2001 | Tsai et al. | 720/606 |
| 6,426,935 B1 | 7/2002 | Imai et al. | |
| 6,496,463 B1 * | 12/2002 | Ogawa et al. | 720/606 |
| 6,587,412 B1 * | 7/2003 | Matsuo et al. | 369/53.12 |
| 6,754,901 B2 * | 6/2004 | Yamanaka | 720/626 |
| 6,854,124 B2 * | 2/2005 | Shimizu et al. | 720/606 |

(Continued)

FOREIGN PATENT DOCUMENTS

EP    1100084 A2    5/2001

(Continued)

*Primary Examiner*—Wayne Young
*Assistant Examiner*—Matthew G Kayrish
(74) *Attorney, Agent, or Firm*—Harness, Dickey & Pierce, PLC (57) ABSTRACT

The present invention provides a disk apparatus reduced in size and thickness, by reducing the size of a means which detects the insertion of a disk into the disk apparatus. In the disk apparatus of the present invention, an electric circuit board and disk insertion-detecting levers are provided on the floating unit, and the disk insertion-detecting levers are disposed in the proximity of the disk insertion/extraction port, and are pressed down and rotated by the outer edge of the inserted disk-shaped recording medium, to thereby directly drive a switch which outputs a disk detection signal to the electric circuit board.

3 Claims, 10 Drawing Sheets

U.S. PATENT DOCUMENTS

| | | | |
|---|---|---|---|
| 2001/0001606 A1* | 5/2001 | Horie | 369/77.2 |
| 2003/0112716 A1* | 6/2003 | Otsuki et al. | 369/30.36 |
| 2003/0161253 A1* | 8/2003 | Liao et al. | 369/263 |
| 2003/0174627 A1 | 9/2003 | Suzuki | |
| 2003/0193884 A1* | 10/2003 | Louie | 369/291 |
| 2004/0008602 A1* | 1/2004 | Suzuki | 369/77.1 |

FOREIGN PATENT DOCUMENTS

| | | | |
|---|---|---|---|
| JP | 56114156 | | 9/1981 |
| JP | 4228142 | | 8/1992 |
| JP | 6011144 U | | 2/1994 |
| JP | 10-3722 A | | 1/1998 |
| JP | 11066679 | | 3/1999 |
| JP | 2000-90529 A | | 3/2000 |
| JP | 2001110116 | | 4/2001 |
| JP | 2002140852 | | 5/2002 |
| JP | 2003068003 | | 3/2003 |
| JP | 2003-168254 A | | 6/2003 |
| JP | 2006164454 A | * | 6/2006 |
| JP | 2007334953 A | * | 12/2007 |

\* cited by examiner

FIG. 10

DISK APPARATUS HAVING DISK INSERTION DETECTING LEVERS DISPOSED IN PLANE OF DISK AND ROTATABLE IN AXIAL DIRECTION RELATIVE TO DISK

TECHNICAL FIELD

The present invention relates to a disk apparatus which records and/or reproduces data on or from a disk-shaped recording medium such as CD, DVD or the like, and in particular, to the disk-loading mechanism for loading a disk-shaped recording medium on a disk apparatus.

BACKGROUND OF THE INVENTION

Disk apparatuses which record data on and/or reproduce data from disk-shaped recording media (hereinafter referred to as disks) such as CD, DVD, etc. are today reduced in size and weight suitable for portable use or for equipment on vehicles. In a disk apparatus of this type, the frame having a turn table and a spindle motor mounted thereon has a floating structure which allows the frame to be supported by viscoelastic means so as not to directly transmit vibrations from an external to the turn table having a disk placed thereon. The frame having such a floating structure (i.e., a floating flame) includes a disk carriage-driving mechanism which carries an inserted disk to a recording/reproducing position and ejects the disk from the recording/reproducing position, a disk-clamping mechanism which holds the disk immovable at the recording/reproducing position, and a disk recording/reproducing mechanism which performs recording or reproducing on the disk at the recording/reproducing position (cf. Patent Literature 1).

Patent Literature 1: JP-A-07-272417 (pages 4 to 6 and FIG. 3)

DISCLOSURE OF THE INVENTION

Problems to be Solved by the Invention

In any of the conventional disk apparatuses, the respective mechanisms of the disk apparatus start to operate, upon inserting a disk into the disk apparatus. Therefore, a disk apparatus of the conventional type is provided with a disk insertion-detecting means in order to detect the insertion of a disk. In the conventional disk apparatus, an electric circuit board which controls the disk insertion-detecting means and the respective mechanisms is attached to the stationary frame fixed on the casing which shapes the external appearance of the disk apparatus. Thus arranged, a disk inserted into the floating frame inside the disk apparatus is detected by the disk insertion-detecting means provided on the stationary frame, and this disk-detection data is inputted as a signal to the electric circuit of the electric circuit board. Consequently, in this conventional disk apparatus, it is necessary that spaces for providing the disk insertion-detecting means and operating the same should be ensured in both of the stationary frame and the floating frame, and also, the provision of the disk insertion-detecting means increases the number of the components or parts of the conventional disk apparatus. For this reason, the disk insertion-detecting means has been a hindrance to the reduction of the size and thickness of the disk apparatus.

The present invention is intended to provide a disk apparatus reduced in size and thickness, by reducing the size of a disk insertion-detecting means which has been a hindrance to the reduction of the sizes and thickness of the conventional disk apparatuses.

Means for Solving Problems

As described in claim 1, a disk apparatus according to the present invention comprises a stationary frame as a stationary side, and a floating unit which is disposed in the stationary frame through viscoelastic means, and which has a function to record data on and/or reproduce the data from a disk-shaped recording medium inserted into the disk apparatus, wherein the floating unit includes a disk-carrying means which carries the disk-shaped recording medium inserted from a disk insertion/extraction port formed on the stationary frame, a disk-clamping means which clamps the disk-shaped recording medium at a recording/reproducing position, a disk recording/reproducing-driving means which rotates the disk-shaped recording medium to record the data on or reproduce the data from the disk-shaped recording medium, an electric circuit board having an electric circuit which controls the driving of the disk-carrying means, the disk-clamping means and the disk recording/reproducing-driving means, and disk insertion-detecting levers which are disposed in the proximity of the disk insertion/extraction port, and which are pressed down and rotated by the outer edge of the inserted disk-shaped recording medium, so as to directly drive a switch which outputs a disk detection signal to the electric circuit.

In the disk apparatus thus arranged, the disk insertion-detecting levers which reliably detect the inserted disk can be reduced in size, so that the reduction of the size and thickness of a whole of the disk apparatus can be realized.

As described in claim 2, in the disk apparatus of claim 1, the disk insertion-detecting levers are disposed in the proximity of both sides of the disk insertion/extraction port, and each of the disk insertion-detecting levers has a blade-shaped part which is spread to both sides and is a little raised at its both ends, and a projection which presses the switch of the electric circuit board, when the disk insertion-detecting lever is rotated. Thus arranged, the disk apparatus of the present invention can reliably detect the insertion of the disk-shaped recording medium.

As described in claim 3, in the disk apparatus of claim 1 or 2, an ejection-detecting lever is further disposed in the proximity of the disk insertion-detecting lever, and is pressed down and rotated by the outer edge of the disk-shaped recording medium, so as to output, to the electric circuit, a signal which indicates the detection of the ejection of the disk. Thus arranged, the disk apparatus of the present invention can reliably detect the insertion of the disk-shaped recording medium, and also can detect the ejection of the disk-shaped recording medium.

Effect of the Invention

According to the present invention, a disk apparatus reduced in size and thickness can be provided, since the reduction of the size of the disk insertion-detecting means can be realized by providing a floating unit which is viscoelastically supported on the stationary frame fixed to the casing which shapes the external appearance of the disk apparatus, and providing, on the floating unit, disk detection levers which reliably detect an inserted disk, and an electric circuit

DESCRIPTION OF REFERENCE NUMERALS

1=an upper frame
2=a disk guide
3=a clamping member
4=a disk-carrying member
5=a disk carriage-driving member
6=a traverse chassis
7=a disk recording/reproducing-driving member
8=a printed board
9=a lower frame
10=a floating unit
11=a disk insertion/extraction port
40=a roller arm
41=a disk insertion-detecting lever
41a=a detection face
41b=a rotation center shaft
41c=a detection part
42=a disk ejection-detecting lever
81=a detection switch
61=a chin guard
101=a disk

BEST MODES FOR CARRYING OUT THE INVENTION

Hereinafter, preferred embodiments of a disk apparatus according to the present invention will be described with reference to the accompanying drawings.

First Embodiment

Figure 1:
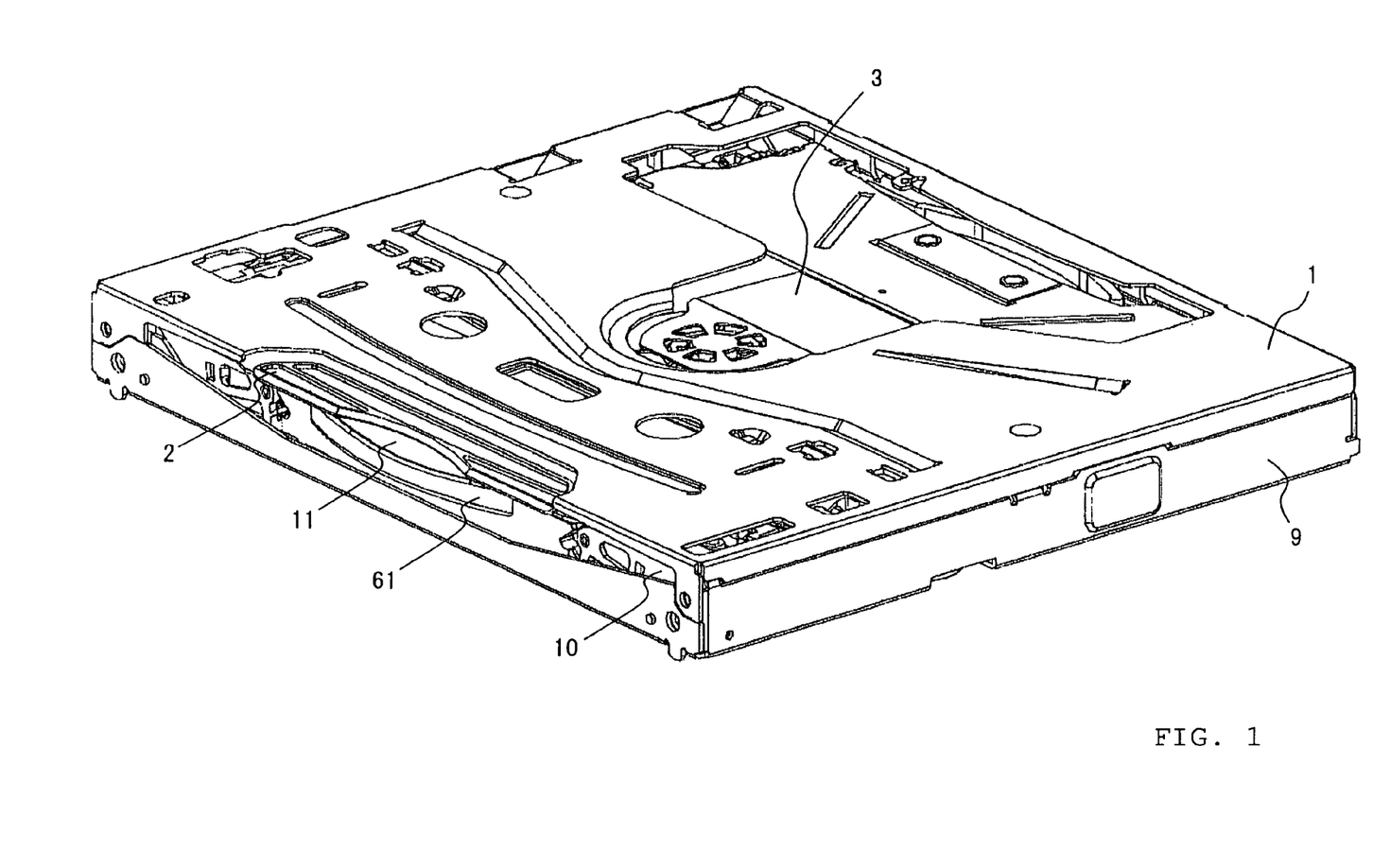
FIG. 1 is a perspective view showing a disk apparatus without an outer casing,-according to the first embodiment of the present invention.
Figure 2:
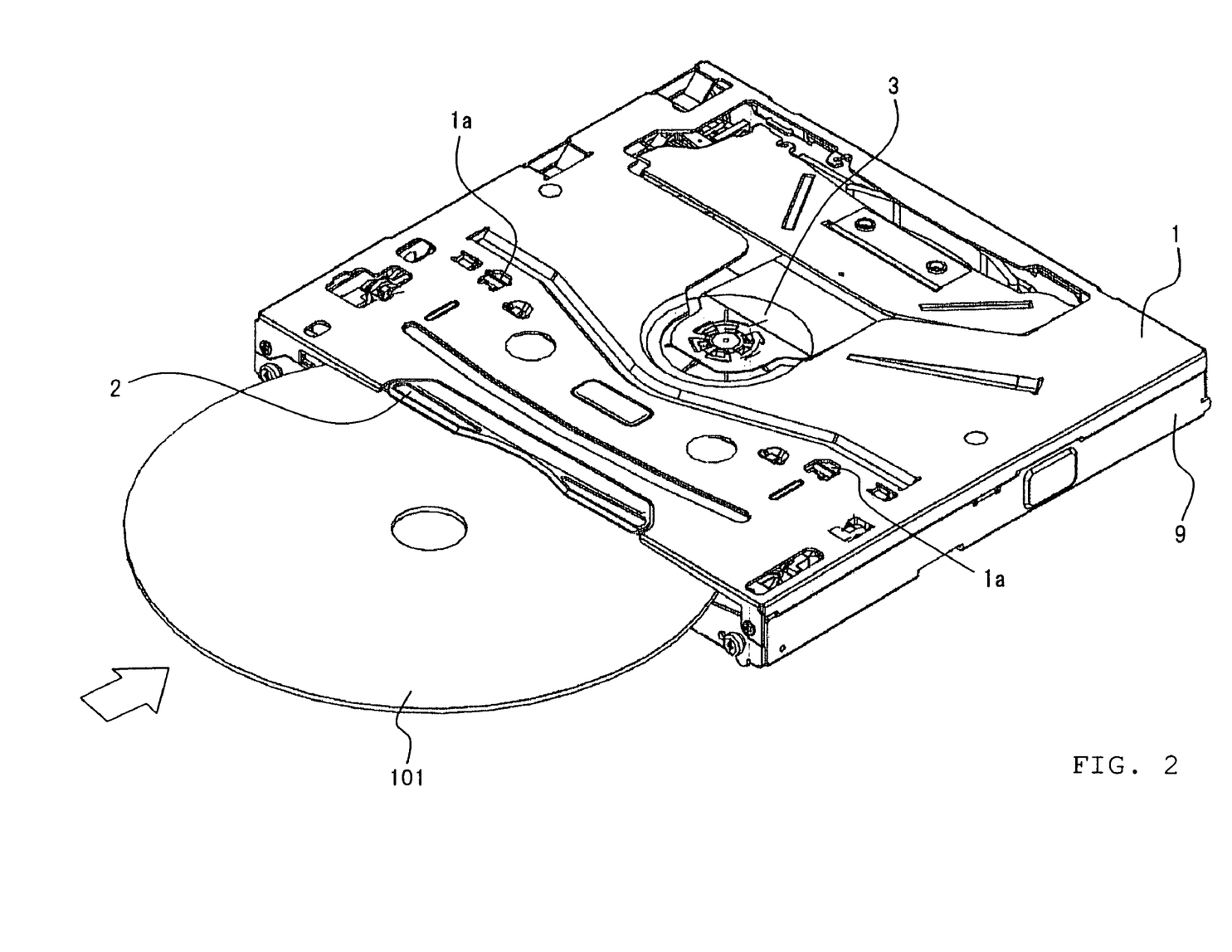
FIG. 2 is a perspective view showing the disk apparatus shown in FIG. 1, into which a disk-shaped recording medium is being inserted.
Figure 3:
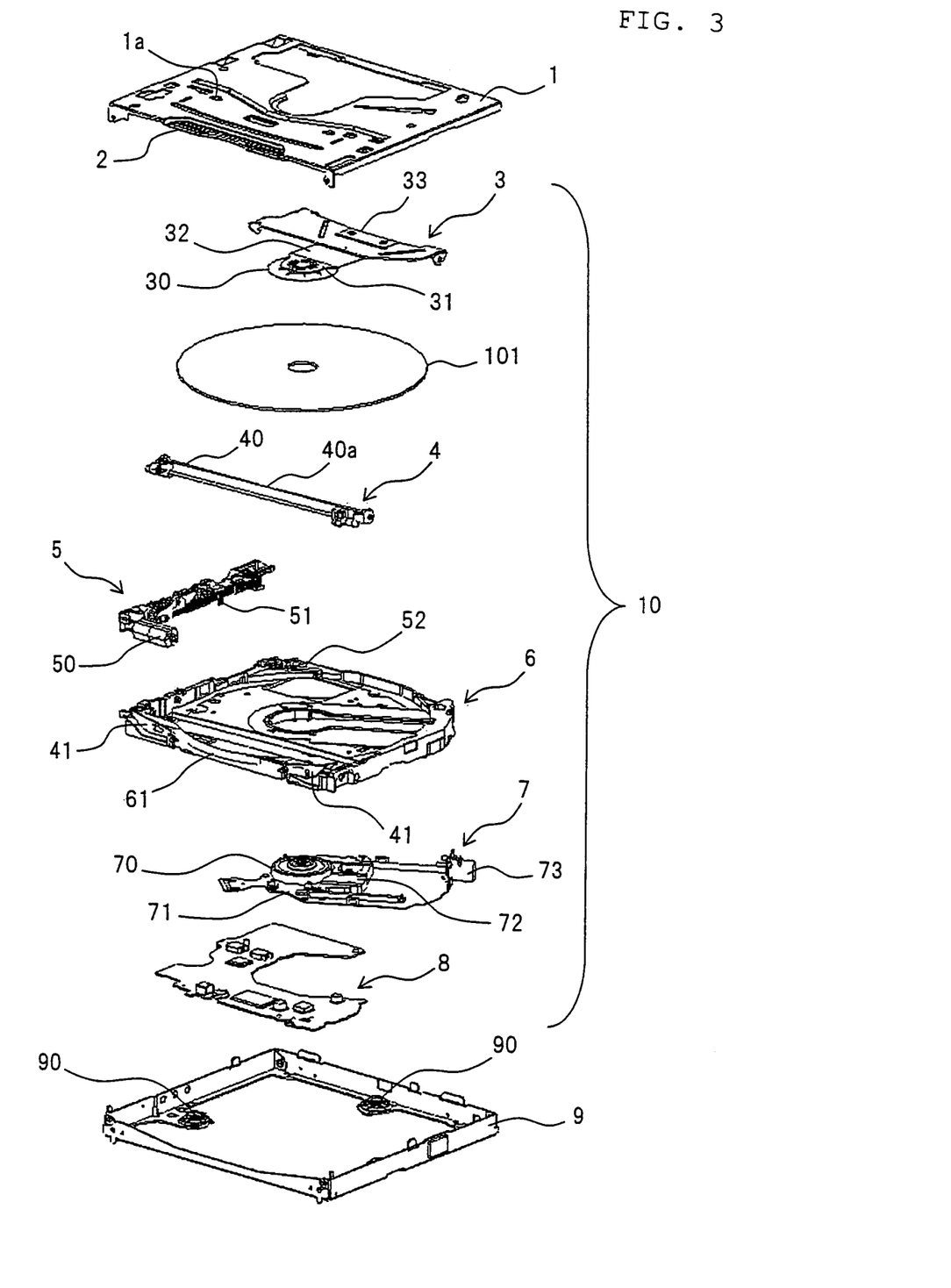
FIG. 3 is an exploded perspective view showing the disk apparatus shown in FIG. 1, illustrating the internal mechanisms thereof.

FIG. 1 is a perspective view showing a disk apparatus without an outer casing, according to the first embodiment of the present invention. FIG. 2 is a perspective view showing the disk apparatus shown in FIG. 1, into which a disk-shaped recording medium, i.e., a disk, is being inserted. FIG. 3 is an exploded perspective view showing the disk apparatus shown in FIG. 1, illustrating the internal mechanisms thereof.

The disk apparatus according to the first embodiment shown in FIGS. 1 to 3 has a function to perform recording and reproducing on a disk 101 as the disk-shaped recording medium such as CD, DVD or the like. The disk 101 is inserted in its diameter direction and loaded on the disk apparatus, to record data thereon or reproduce the date therefrom.

The disk apparatus of the first embodiment comprises an upper frame 1 fixed to the casing which shapes the external appearance of the disk apparatus, and a lower frame 9 in which a floating unit 10 is viscoelastically supported by a plurality of damper springs 90 (see FIG. 3) made of a viscoelastic material is provided.

As shown in FIG. 3, the floating unit 10 comprises a clamping member 3 which holds an inserted disk 101 between itself and the turn table 70; a disk-carrying member 4 which carries the disk 101; a disk carriage-driving member 5 which includes a driving source for the disk-carrying member 4; a traverse chassis 6 which locates the disk 101 at a recording/reproducing position; a disk recording/reproducing-driving member 7 which drives the disk 101 to rotate so as to record data on or reproduce the data from the disk 101; and a printed board 8 which is attached on the reverse of the traverse chassis 6 (the other surface of the traverse chassis 6 having the disk placed on its one surface) and which has electric circuits for controlling the driving of the respective mechanisms of the floating unit 10, thereon.

The floating unit 10 thus arranged is viscoelastically supported in a floating state by a plurality of damper springs 90 which are provided on the upper frame 1 and the lower frame 9, respectively.

Figure 4:
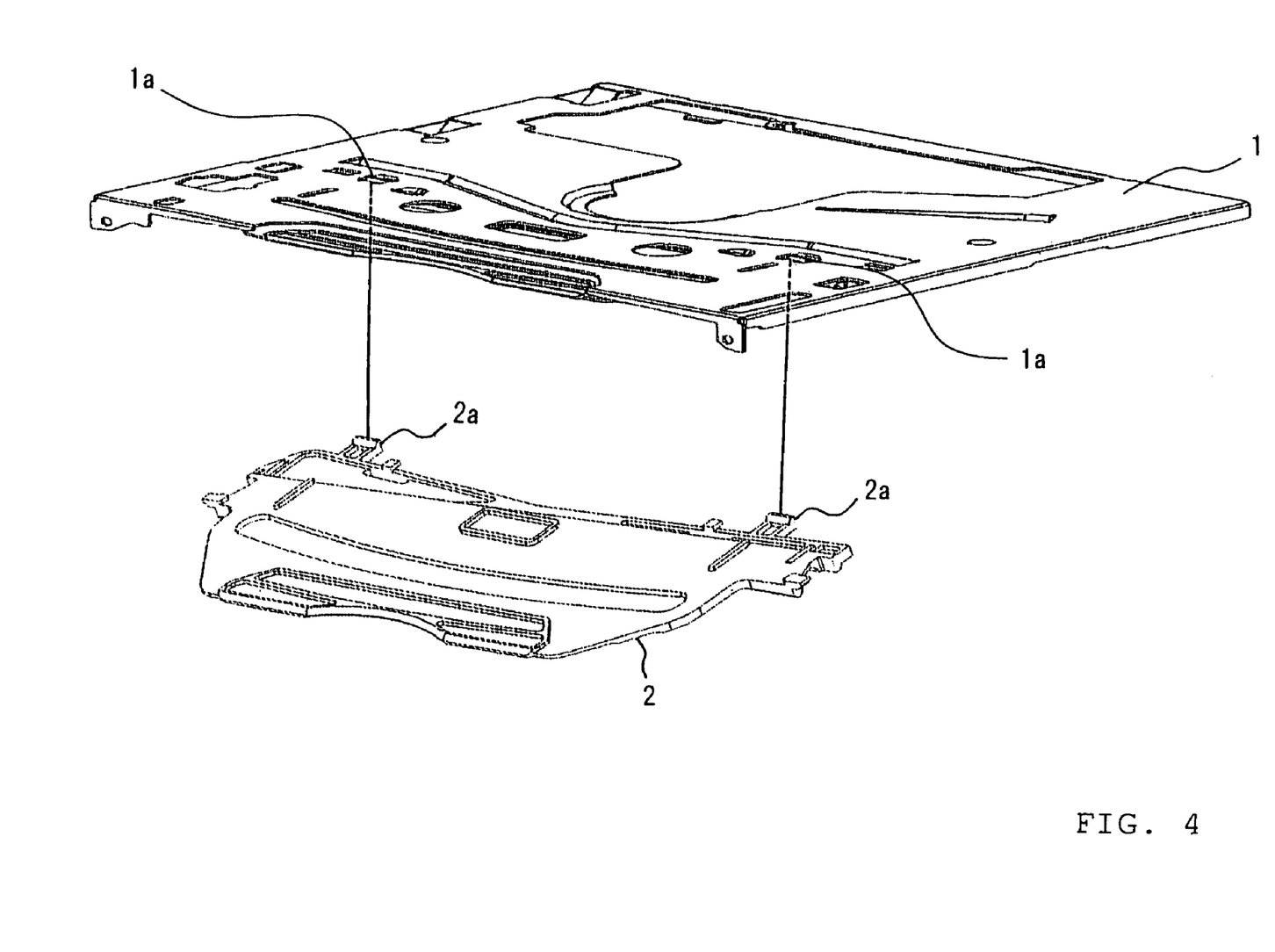
FIG. 4 is an exploded perspective view showing the upper frame 1 of the disk apparatus according to the first embodiment.

FIG. 4 is the exploded perspective view showing the upper frame 1. As shown in FIG. 4, the disk guide 2 is rotatably held in suspension at two points from the reverse of the upper frame 1. The two projections 2a, 2a formed on the disk guide 2 are fitted in and engaged with the holes 1a, 1a formed in the upper frame 1, so that the disk guide 2 can be rotated a predetermined angle on their engaged parts as the center, relative to the upper frame 1, at the front side of the disk apparatus.

Figure 5:
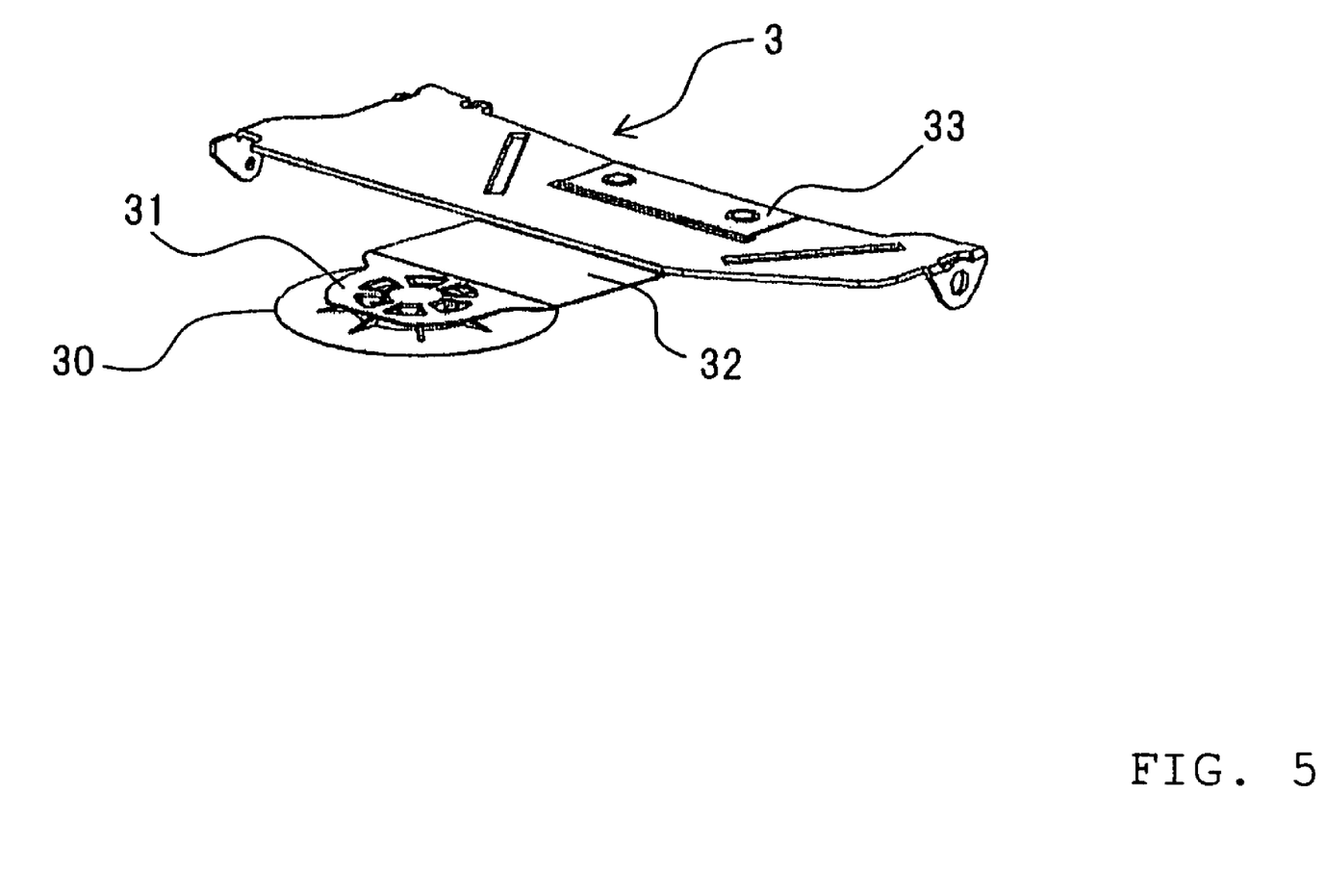
FIG. 5 is a perspective view showing the clamping member 3 of the disk apparatus according to the first embodiment.

FIG. 5 is a perspective view showing the clamping member 3. As shown in FIG. 5, the clamping member 3 comprises a damper 30 which is used to press down the inserted disk 101, a clamper-holding part 31 which floatably holds the clamper 30, and a damper base 33 which secures the clamper-holding part 31 to the traverse chassis 6 through a damper arm 32. The damper arm 32 which mechanically connects the damper base 33 to the clamper-holding part 31 is made of an elastic material such as a thin metal sheet, and regulates the pressure of the damper 30 for holding down the disk. The damper 30 is held by the clamper-holding part 31 while being rotatably engaged with the clamper-holding part 31.

When the disk 101 is inserted and carried inside the disk apparatus, the clamping member 3 thus arranged is located above the turn table 70, i.e., at a position away from the turn table 70 and in contact with the upper frame 1. In the clamping member 3, the damper base 33 is mounted around the shaft of the traverse chassis 6 of the floating unit 10, and the damper 30 is always urged toward the turn table 70 by urging means (not shown) such as a spring, a clank mechanism or a cam mechanism, provided on the shaft of the traverse chassis. When the disk 101 is not at the recording/reproducing position, the damper 30 is placed in contact with the upper frame 1 by a stopper means, and thus is located at a position away from the turn table 70. When the disk 101 is inserted and carried to that position above the turn table 70 (the recording/reproducing position), the above stopper means is released, so that the urging force from the spring, the clank mechanism or the cam mechanism causes the damper 30 to press down the turn table 70 through the disk 101.

Figure 6:
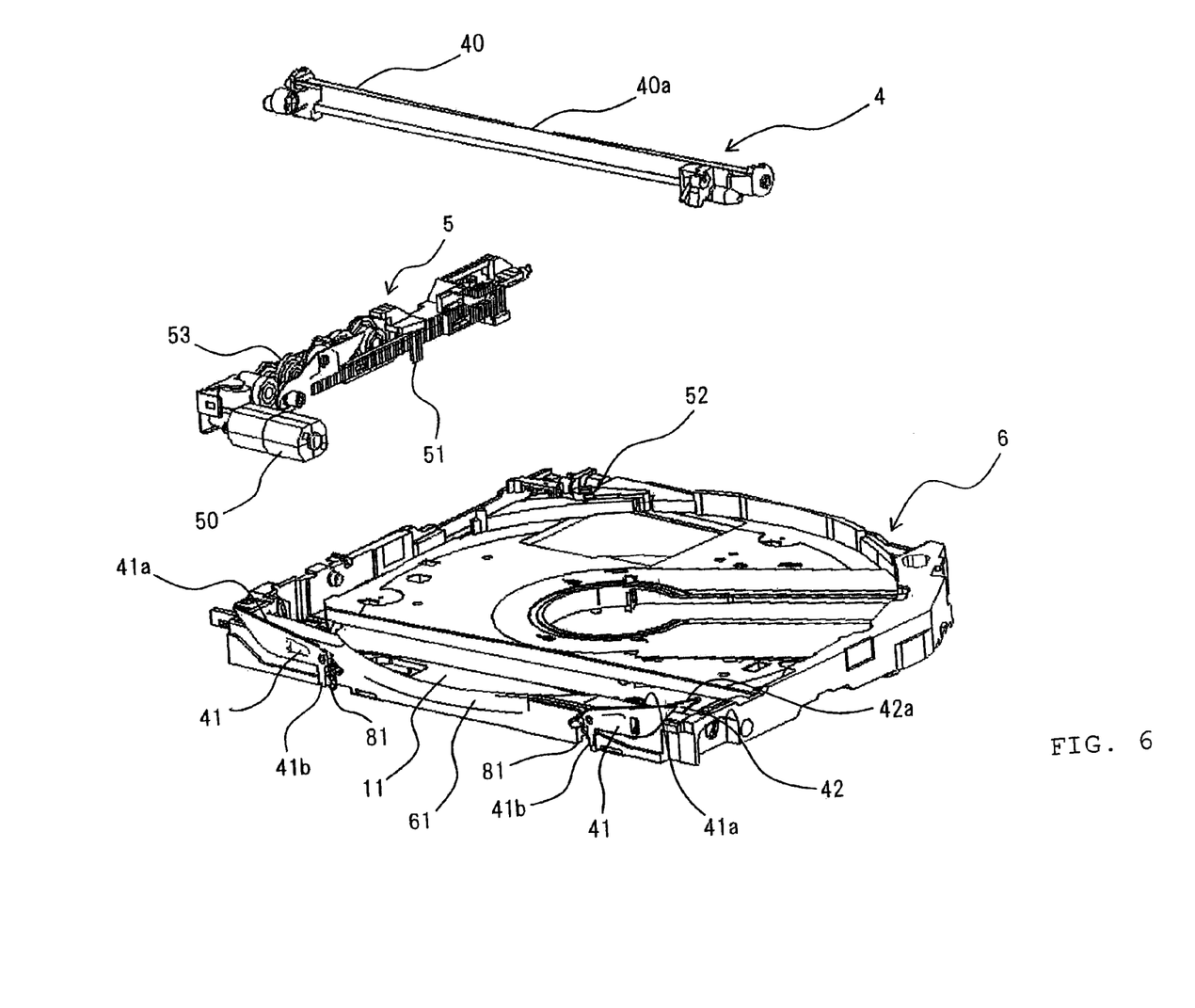
FIG. 6 is perspective views showing the disk-carrying member 4, the disk carriage-driving member 5 and the traverse chassis 6 of the floating unit 10 of the disk apparatus according to the first embodiment.

FIG. 6 is the perspective views showing the disk-carrying member 4, the disk carriage-driving member 5 and the traverse chassis 6 of the floating unit 10 of the disk apparatus of the first embodiment.

The disk carrying member 4 includes a roller arm 40 having a carriage roller 40a which rotates itself while pressing the disk 101 inserted from the disk insertion/extraction port 11, onto the disk guide 2, to thereby carry the disk 101 along a given locus in the disk apparatus. The carriage roller 40a of the roller arm 40 is usually pressed onto the disk guide 2 by the urging force from a spring, while the disk 101 is located at other positions except for the recording/reproducing position. When the carriage of the disk has been completed and when the disk 101 has reached the recording/reproducing position, the carriage roller 40a of the roller arm 40 is moved downward (in a direction away from the disk guide 2).

In the disk apparatus of the first embodiment, the rotation shaft of the carriage roller 40a is inclined a predetermined angle relative to the front face of the disk apparatus at which the disk insertion/extraction port 11 is provided. This is because it is needed to obliquely carry the disk, since the disk apparatus is not arranged so that the locus of the motion of insertion or ejection of the disk 101 on the traverse chassis 6 can orthogonally intersect a parallel line to the disk insertion/extraction port 11 of the disk apparatus, in other words, so that the disk 101 can be moved straightly in the fore and aft direction of the disk apparatus, when the disk apparatus is seen from just above. Therefore, the inserted disk 101 is carried oblique to the front face of the disk apparatus at which the disk insertion/extraction port 11 is provided. In the first embodiment, the motor 50 of the disk carriage-driving member 5 is disposed in the proximity of the disk insertion/extraction port 11 of the front face of the traverse chassis 6, and a part of the recording/reproducing position is located on the rear side of the motor 50. For this reason, the disk 101 is carried oblique from the disk insertion/extraction port 11, in the first embodiment.

The disk carriage-driving member 5 shown in FIG. 6 comprises the motor 50 which drives and rotates the carriage roller 40a of the roller arm 40 while the disk is being carried (or while the disk is being loaded) in the disk apparatus; a control slider 51 which holds the traverse chassis 6 unmoved on the upper frame 1 before the insertion of the disk or after the completion of ejection of the disk (after the unloading of the disk); a trigger lever 52 which detects the reaching of the disk 101 to the recording/reproducing position after the completion of the carriage of the disk; and a gear train 53 which transmits the rotation of the motor 50 to the control slider 51. The trigger lever 52 is located at a position on the rear side of the traverse chassis 6 in FIG. 6, in which one end of the trigger lever 52 is in contact with the rear end portion of the control slider 51, so that the control slider 51 is moved together with the motion of the trigger lever 52. The other end of the trigger lever 52 within the traverse chassis 6 is located at a position where the other end of the trigger lever 52 can contact the edge of the disk 101, when the disk 101 has reached the position above the recording/reproducing position.

The disk recording/reproducing driving member 7 and the printed board 8 are secured on the reverse of the traverse chassis 6 which has the above disk-carrying member 4 and the above disk carriage-driving member 5 mounted thereon.

Provided on the front of the traverse chassis 6 are disk insertion-detecting levers 41 which are disposed in the proximity of the disk insertion/extraction port 11 so as to detect the insertion of the disk 101 into the disk apparatus, and a disk ejection-detecting lever 42 which is disposed at the rear of the disk detecting lever 41 so as to detect the ejection of the disk 101. The disk insertion-detecting levers 41 and the disk ejection-detecting lever 42 are usually urged upward by forces from springs, and thus are located at predetermined positions on the upper side, when the disk 101 is not inserted.

As shown in FIG. 6, the disk insertion-detecting levers 41 are disposed at and around both sides of the disk insertion/extraction port 11, and are formed in the shapes of blades which spread to both sides and are raised at both ends. When the disk 101 is inserted into the disk insertion/extraction port 11, the outer edge of the disk 101 presses down the detection faces 41a (the upper faces as seen in FIG. 6) of either or both of the disk insertion-detecting levers 41 which are disposed at both sides, so that the projections 41b formed on the detecting levers 41 press down detection switches 81 which are mechanical switches. When this detection switches 81 are pressed down, the carriage roller 40a starts to rotate, and the inserted disk 101 is carried by the rotation of the carriage roller 40a, to an intended position of the traverse chassis 6.

Figure 7:
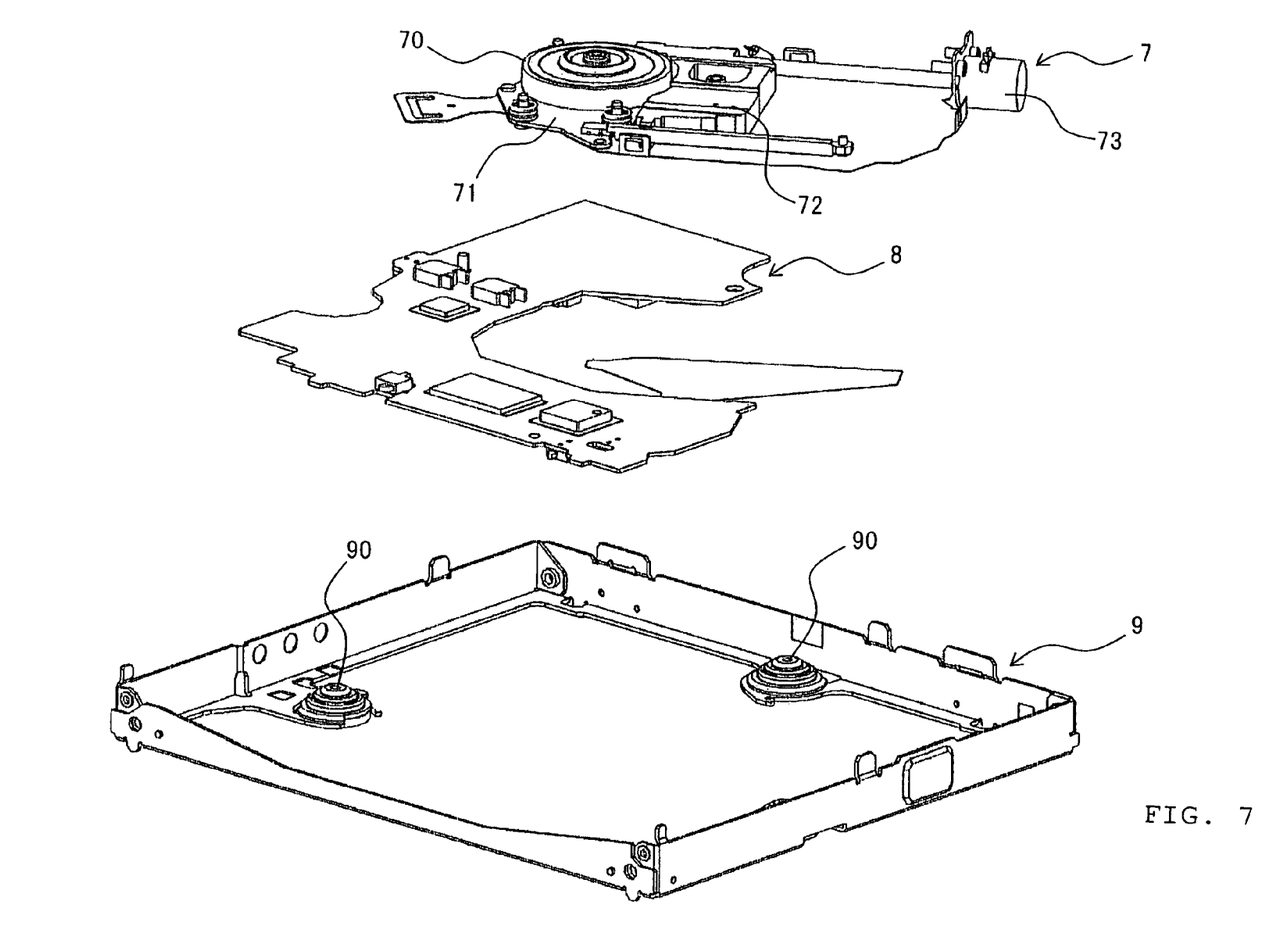
FIG. 7 is an exploded perspective view showing the disk apparatus according to the first embodiment, illustrating the disk recording/reproducing driving member 7, the printed board 8, and the lower frame 9 which supports the traverse chassis 6 through damper springs 90.

FIG. 7 is the exploded perspective view showing the disk apparatus, illustrating the disk recording/reproducing driving member 7, the printed board 8 and the lower frame 9. The lower frame 9 supports the floating unit 10 including the traverse chassis 6, etc. through damper springs 90. As shown in FIG. 7, the disk recording/reproducing driving member 7 includes the turn table 70 which is rotated with the disk 101 placed thereon, the spindle motor 71 for rotating the turn table 70, an optical pickup member 72 which records data on or reproduce the data from the disk 101, and an optical pickup driving motor 73 which drives the-optical pickup member 72 in the diameter direction of the disk 101. The printed board 8 is attached on the reverse of the traverse chassis 6, and has electric circuits formed thereon for controlling the driving of the respective mechanisms provided on the traverse chassis 6.

The traverse chassis 6 thus arranged is supported on the lower frame 9 as the stationary frame secured on the casing which shapes the external appearance of the disk apparatus, through the damper springs 90 having viscoelastic functions. Before the insertion of the disk, the traverse chassis 6 is located at a position on the lower side in the frame comprising the upper frame 1 and the lower frame 9, by the control slider 51 and the roller arm 40 pressed onto the disk guide 2. When the disk 101 is inserted in this state, the disk 101 enters between the carriage roller 40a of the roller arm 40 and the disk guide 2, and is then carried to the recording/reproducing position. When the disk 101 has reached the recording/reproducing position, the traverse chassis 6 is put in a floating state and is lifted,-and the disk 101 is held between the turn table 70 and the damper 30.

Next, to eject the disk 101, the roller arm 40 pressed onto the disk guide 2 and the control slider 51 compress the damper springs 90 to thereby move the traverse chassis 6 downward and locate the traverse chassis 6 at the lower position in the stationary frame.

Next, the disk insertion-detecting lever 41 provided on the floating unit 10 of the disk apparatus of the first embodiment will be described.

Figure 8:
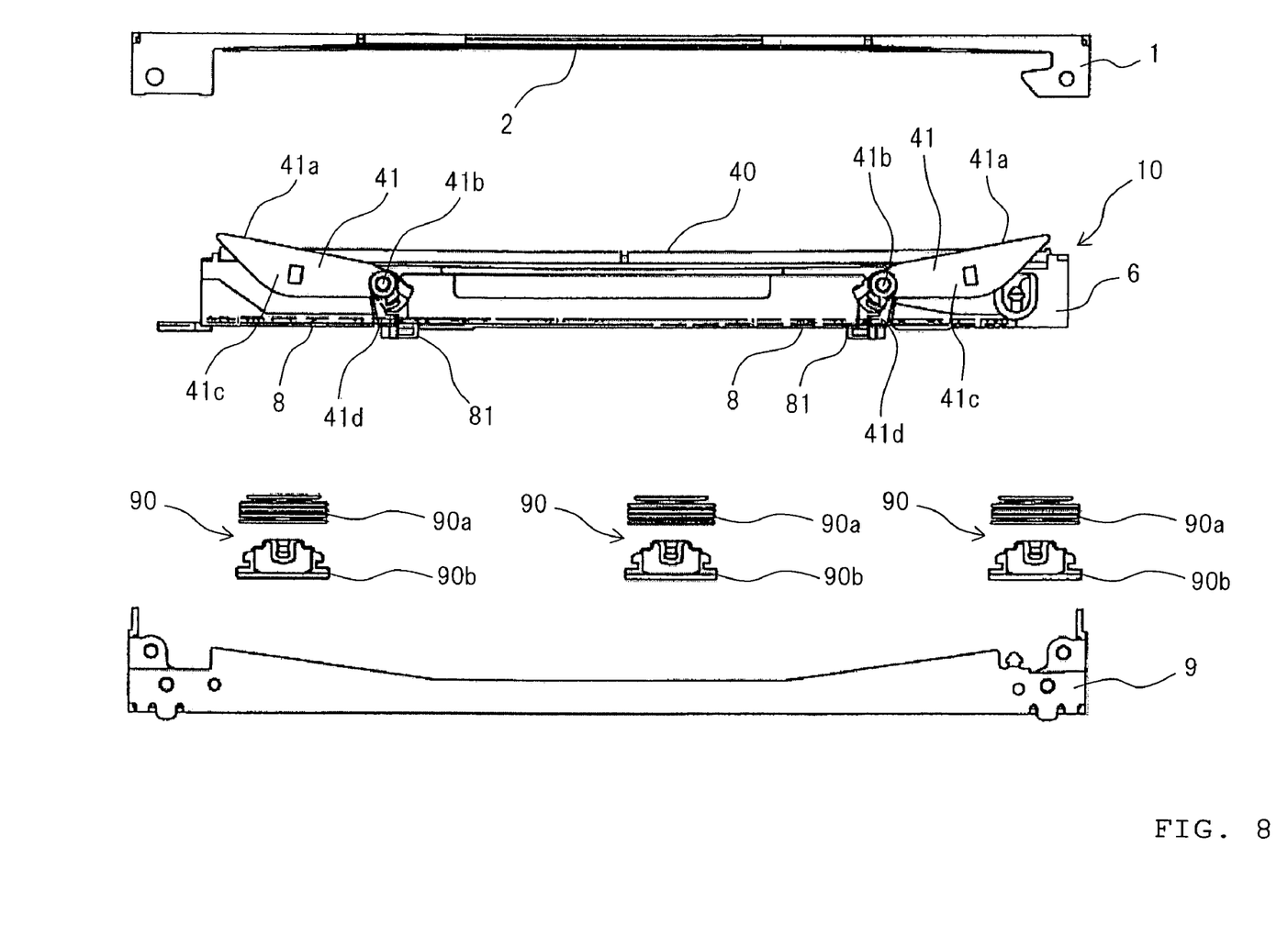
FIG. 8 is the front views showing the upper frame 1, the floating unit 10 and the lower frame of the disk apparatus according to the first embodiment.

FIG. 8 shows the front sides of the upper frame 1, the floating unit 10 and the lower frame 9 according to the first embodiment, namely, the front views thereof on the side of the disk insertion/extraction port, illustrating the damper springs 90 which are disposed between the floating unit 10 and the lower frame 9 to viscoelastically connect the floating unit 10 to the lower frame 9. Each of the damper springs 90 comprises a spiral spring 90*a* and a damper 90*b* which is formed of an insulating material such as rubber to thereby improve the vibration resistance of the disk apparatus.

As shown in FIG. 8, the disk insertion-detecting levers 41 are disposed in the proximity of the disk insertion/extraction port 11 and at both sides of the front face of the floating unit 10. Each of the disk insertion-detecting levers 41 has a rotational center shaft 41*b* on the inward side of the. disk apparatus, and a detection part 41*c* which extends outward of the disk apparatus and raised at its end. The disk insertion-detecting levers 41 as a whole are formed in the shapes of blades with their both ends raised. The upper face of the detection part 41*c* facing the disk 101 functions as a detection face 41*a*. A projection 41*d* is formed on the opposite side of each of the detection parts 41*c* with the rotational center shaft 41*b* therebetween. This projection 41*d* is disposed a given distance away from a detection switch 81 which is a mechanical switch on the printed board 8 attached on the reverse of the traverse chassis 6 of the floating unit 10, so that the detection switch 81 can be reliably operated by the motion of the projection 41*d*.

Figure 9:
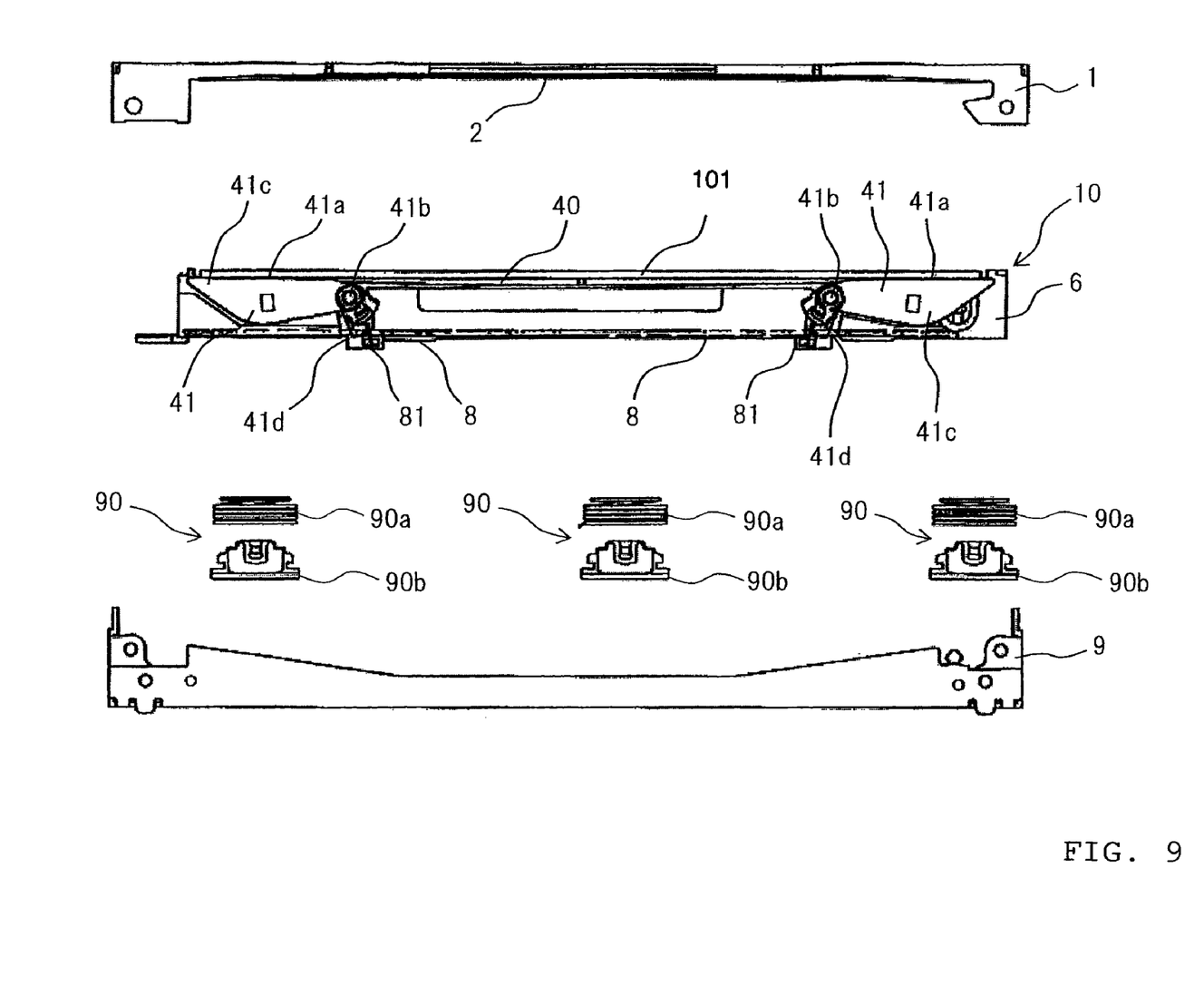
FIG. 9 is the front views showing the upper frame 1, the floating unit 10 and the lower frame 9, shown in FIG. 8, of the apparatus according to the first embodiment, illustrating the state where a disk is loaded on the lower frame 9.
Figure 10:
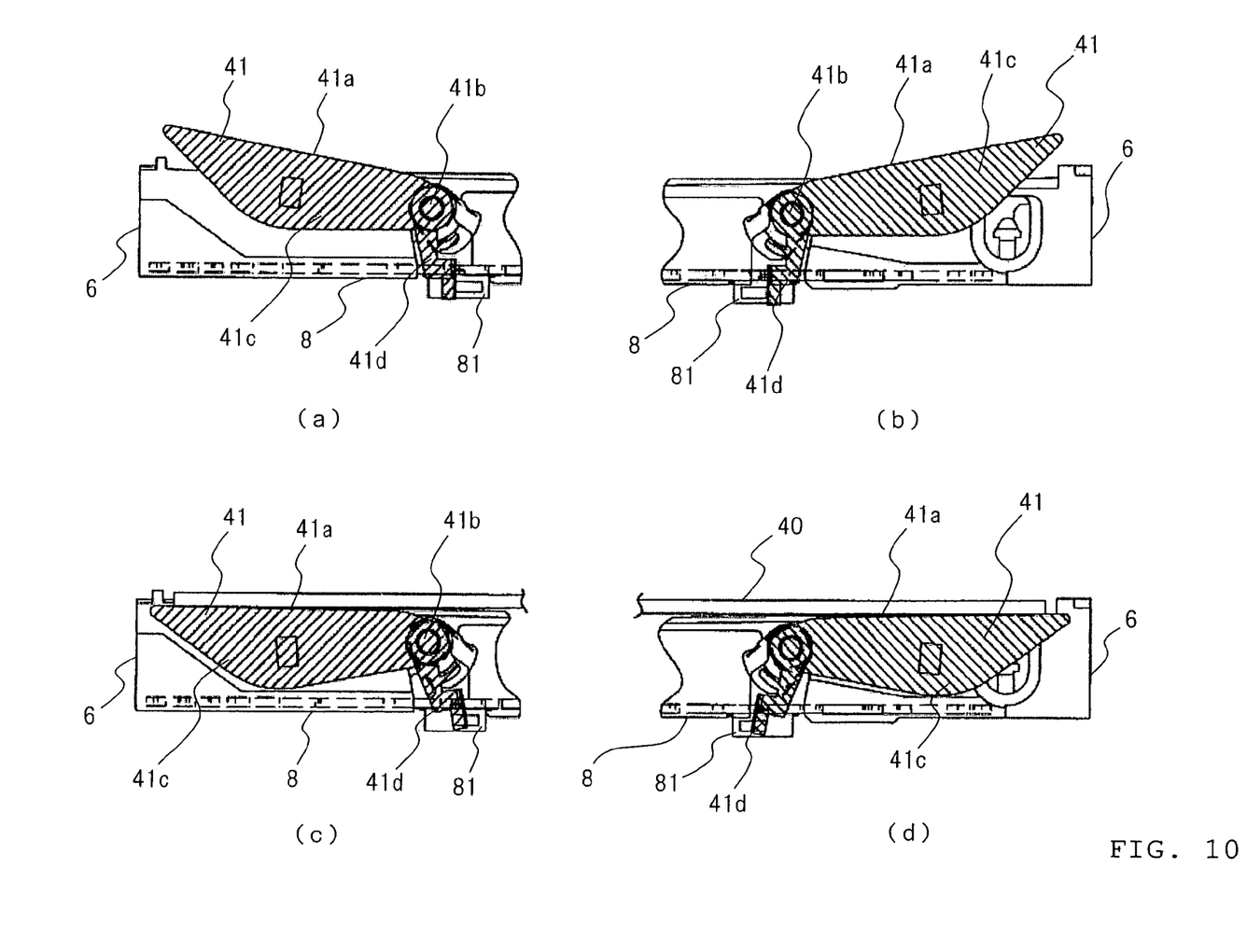
FIG. 10 is the enlarged front views showing the disk insertion-detecting levers 41 according to the first embodiment illustrating the operation of the same.

FIG. 9 is the front views showing the upper frame 1, the floating unit 10 and the lower frame 9 according the first embodiment shown in FIG. 8, illustrating the state where the disk 101 is loaded on the lower frame 9. FIG. 10 is the enlarged front views showing the disk insertion-detecting levers 41 according to the first embodiment, illustrating the operation of the disk insertion-detecting levers 41. In FIG. 10, the disk insertion-detecting levers 41 are drawn with oblique parallel lines. In FIG. 10, (a) shows the left disk insertion-detecting lever 41 on the front face of the disk apparatus, seen from our side, when the disk is not loaded. (b) of FIG. 10 shows the right disk insertion-detecting lever 41 on the front face of the disk apparatus, seen from out side, when the disk is not loaded. (c) of FIG. 10 shows the left disk insertion-detecting lever 41 on the front face of the disk apparatus, seen from our side, when the disk is loaded. (d) of FIG. 10 shows the right disk insertion-detecting lever 41 on the front face of the disk apparatus, seen from out side, when the disk is loaded.

As shown in FIG. 9, and (c) and (d) of FIG. 10, when the disk 101 is inserted from the disk insertion/extraction port 11, the outer edge of the disk 101 presses down and spreads the detection faces 41*a* (the upper faces shown in FIG. 6), inclined upward, of the disk insertion-detecting levers 41 disposed at both sides. At this moment of time, the detection parts 41*c* in the shapes of blades are always raised at both sides so that the detection faces 41*a* do not come into contact with the recording face of the disk 101. By rotating the detection parts 41*c* in this way, each of the projections 41*d* provided through the rotational center shaft 41*b* presses the detection switch 81 to turn on the detection switch 81. When the detection switch 81 is turned on, a disk insertion detection signal is inputted to the electric circuit of the printed board 8 to thereby drive the respective mechanisms provided on the floating unit 10.

Next, the operation of the disk apparatus with the above arrangement, of the first embodiment, will be described.

When the disk 101 is inserted from the disk insertion/extraction port 11 of the disk apparatus of the first embodiment, the disk insertion-detecting levers 41 are pressed down by the disk 101, so that the insertion of the disk 101 is detected. When the insertion of the disk 101 is detected, the roller arm 40 rotates itself and simultaneously presses the disk 101 onto the disk guide 2 of the upper frame 1. As a result, the disk 101 is carried to the disk recording/reproducing position in the disk apparatus. At this moment of time, the control slider 51 of the disk carriage-driving member 5 is in contact with the upper flame 1, and the traverse chassis 6 is held immovable.

In the disk apparatus of the first embodiment, the roller arm 40 is secured oblique to the disk insertion/extraction port 11, i.e., the front face of the disk apparatus, and thus, the disk 101 is carried oblique to the front face of the disk apparatus. This is because, as shown in FIG. 6, the motor 50 is disposed at the left side of the disk insertion/extraction port 11 of the disk apparatus, seen from our side, and because a part of the disk recording/reproducing position is located on the rear side of the motor 50. As described above, the respective mechanisms on the traverse chassis 6 are organized in the disk apparatus of the first embodiment, and also are efficiently disposed so that no dead space is formed therein.

When the disk 101 has reached the disk recording/reproducing position, the trigger lever 52 comes into contact with the disk 101, and the following sequential operation of the control slider 51, etc. stops the rotation of the roller arm 40, and the roller arm 40 moves downward from the disk recording/reproducing face. This downward motion of the roller arm 40 from the disk recording/reproducing face moves downward the disk guide 2 which has been in contact with the roller arm 40 through the disk 101. In this downward motion of the disk guide 2, the disk guide 2, which is held in suspension at two engaging positions from the upper frame 1, is rotated on the two engaging positions as the center; and thus comes into contact with the chin guard 61 formed on the front side of the traverse chassis 6. By allowing the disk guide 2 to rotate and contact the chin guard 61 in this way, a part of the disk insertion/extraction port 11 is closed to thereby prevent another disk guide 101 from being inserted. The chin guide 61 formed on the front side of the traverse chassis 6 is a frame which composes the lower side wall of the disk insertion/extraction port 11, and which is formed as a protruded curvature so as to receive the disk at the front side of the disk apparatus.

When the trigger lever 52 of the disk carriage-driving member 5 contacts the disk 101, the control slider 51 is moved in a direction opposite the direction found when the disk is inserted. By-this motion of the control slider 51, the control slider 51 leaves from the upper frame 1, and the traverse chassis 6 is viscoelastically held by the damper springs 90, in other words, the floating unit 10 is held in a-floating state. In this floating state, the damper 30 of the clamping member 3 is pressed down so that the disk 101 is held between the damper 30 and the turn table 70 at the disk recording/reproducing position. By this operation, the floating unit 10 is somewhat moved downward toward the lower frame 9.

When the disk 101 has been completely held between the damper 30 and the turn table 70 as described above, the disk 101 is rotated, and simultaneously, the optical pickup member 72 is moved to perform recording or reproducing on the disk 101.

When the recording or reproducing operation on the disk 101 has been completed, and when, for example, a disk ejection instruction is inputted to the disk apparatus from an external, the roller arm 40 is moved upward to thereby press the disk 101 onto the disk guide 2 of the upper frame 1. At this moment of time, the control slider 51 of the disk carriage-driving member 5 is moved to contact the upper frame 1, so that the motion of the traverse chassis 6 is restricted. At this moment of time, the disk guide 2 is moved upward to open the disk insertion/extraction port 11.

In this state, the roller arm 40 is rotated to eject the disk 101 from the disk insertion/extraction port 11. The ejection of the disk 101 is detected by the ejection detecting lever 42 provided on the traverse chassis 6. The ejection detecting lever 42 is formed in the shape of a blade which is a little raised at its end, as well as the disk insertion-detecting levers 41 which are disposed in the proximity of both sides of the disk insertion/extraction port 11. When the disk 101 is ejected from the disk insertion/extraction port 11, the outer edge of the disk 101 presses down the detection face 42a of the ejection detecting lever 42 (the upper face of the ejection-detecting lever 42 shown in FIG. 6). When the intended portion of the disk 101 has been ejected from the disk insertion/extraction port 11, the end portion of the ejection-detecting lever 42 is raised, from which the completion of the ejection of the disk 101 is detected. When the ejection of the disk 101 is completed in this way, the rotation of the roller arm 40 is stopped. After that, the roller arm 40 is moved upward by the force from the spring, and is held between the disk guide 2 and the lower frame 9. Thus, the ejection of the disk 101 is completed.

While the disk apparatus of the above embodiment is described as being capable of recording and reproducing data, the application of the present invention is not limited to such a disk apparatus. That is, the present invention can be applied to other disk apparatuses for disk-shaped recording media, such as recording disk apparatuses therefor, reproducing disk apparatuses therefor, etc.

INDUSTRIAL APPLICABILITY

The present invention is especially useful for compact disk apparatuses which perform recording or reproducing on disk-shaped recording media such as CD and DVD, and the present invention makes it possible to provide a thinner disk apparatus capable of reliably detecting a disk inserted into the disk apparatus.

What is claimed is:

1. A disk apparatus comprising
a stationary frame as a stationary side, and
a floating unit which is disposed in said stationary frame through elastic component, and which has a function to record data on and/or reproduce the data from a disk-shaped recording medium inserted into said disk apparatus, wherein
said floating unit includes
a disk-carrying means which carries said disk-shaped recording medium inserted from a disk insertion/extraction port formed on said stationary frame,
a disk-clamping means which clamps said disk-shaped recording medium at a recording/reproducing position,
a disk recording/reproducing-driving means which rotates said disk-shaped recording medium about the axis of the disk-shaped recording medium to record the data on or reproduce the data from said disk-shaped recording medium,
an electric circuit board having an electric circuit which controls the driving of said disk-carrying means, said disk-clamping means and said disk recording/reproducing-driving means, and
disk insertion-detecting levers which are disposed in a plane that includes said disk insertion/extraction port, and which are rotated in an axial direction with respect to the disk-shaped recording medium by the outer edge of said inserted disk-shaped recording medium, so as to directly drive a switch which outputs a disk detection signal to said electric circuit.

2. A disk apparatus as recited in claim 1, wherein said disk insertion-detecting levers are disposed in the proximity of both sides of said disk insertion/extraction port, and wherein each of said disk insertion-detecting levers has a blade-shaped part which is spread to both sides and is a little raised at its both ends, and a projection which presses the switch of said electric circuit board, when said disk insertion-detecting lever is rotated.

3. A disk apparatus as recited in claim 1 or 2, wherein an ejection-detecting lever is disposed in the proximity of said disk insertion-detecting lever, and is pressed down and rotated by the outer edge of said disk-shaped recording medium, so as to output, to said electric circuit, a signal which indicates the detection of the ejection of said disk-shaped recording medium.

* * * * *